United States Patent
Song et al.

(10) Patent No.: US 9,235,397 B2
(45) Date of Patent: Jan. 12, 2016

(54) METHOD AND APPARATUS FOR INCREASING TASK-EXECUTION SPEED

(75) Inventors: Hyo-Jung Song, Seoul (KR); Lizy K. John, Austin, TX (US); Ciji Isen, Austin, TX (US); Jung-Pil Choi, Seoul (KR)

(73) Assignees: SAMSUNG ELECTRONICS CO., LTD., Suwon-Si (KR); THE BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 1203 days.

(21) Appl. No.: 12/023,456

(22) Filed: Jan. 31, 2008

(65) Prior Publication Data

US 2008/0301653 A1 Dec. 4, 2008

(30) Foreign Application Priority Data

Jun. 4, 2007 (KR) .................. 10-2007-0054661

(51) Int. Cl.
*G06F 9/45* (2006.01)
*G06F 9/38* (2006.01)
*G06F 9/455* (2006.01)

(52) U.S. Cl.
CPC ............. *G06F 8/52* (2013.01); *G06F 9/3802* (2013.01); *G06F 9/45504* (2013.01)

(58) Field of Classification Search
CPC ....... G06F 8/52; G06F 9/3802; G06F 9/3808; G06F 9/45504; G06F 12/0875
USPC ........................................................... 717/148
See application file for complete search history.

(56) References Cited

U.S. PATENT DOCUMENTS

| | | | | |
|---|---|---|---|---|
| 5,768,593 | A | * | 6/1998 | Walters et al. ................ 717/141 |
| 6,964,039 | B2 | * | 11/2005 | Heeb ............................. 717/148 |
| 7,124,407 | B1 | * | 10/2006 | Wallman ........................ 717/154 |
| 7,150,012 | B2 | | 12/2006 | Hill |
| 7,263,693 | B2 | | 8/2007 | Heeb |
| 8,473,718 | B2 | | 6/2013 | Patel |

(Continued)

FOREIGN PATENT DOCUMENTS

| | | |
|---|---|---|
| JP | 2002-163116 A | 6/2002 |
| JP | 2003-140909 A | 5/2003 |

(Continued)

OTHER PUBLICATIONS

Communication dated May 3, 2012 issued by the State Intellectual Property Office of the PR China in counterpart Chinese Application No. 200810098633.5.

(Continued)

*Primary Examiner* — Wei Zhen
*Assistant Examiner* — Mohammed Huda
(74) *Attorney, Agent, or Firm* — Parker Highlander PLLC

(57) ABSTRACT

Provided are a method and apparatus for increasing task-execution speed, and, more particularly, a method and apparatus for increasing task-execution speed by compiling code to bytecodes, and executing native code in units of blocks instead of bytecodes, in which a block is a group of a series of bytecodes. The apparatus includes a receiving unit which receives a bytecode, a control unit which identifies whether the received bytecode is the last bytecode of a block, and a transmitting unit which transmits an address of a first native code of one or more native codes that correspond to one or more bytecodes included in the block based on the identification result.

12 Claims, 6 Drawing Sheets

(56) References Cited

U.S. PATENT DOCUMENTS

| | | | | |
|---|---|---|---|---|
| 2002/0156977 | A1* | 10/2002 | Derrick | G06F 9/30174 711/118 |
| 2003/0101042 | A1* | 5/2003 | Ollive et al. | 703/25 |
| 2004/0073904 | A1* | 4/2004 | Hill | 718/1 |
| 2004/0210865 | A1* | 10/2004 | Shimura | 717/100 |
| 2004/0243989 | A1* | 12/2004 | Owens et al. | 717/151 |
| 2005/0091650 | A1 | 4/2005 | Heeb | |
| 2006/0070049 | A1* | 3/2006 | Chung | 717/148 |
| 2006/0129990 | A1* | 6/2006 | Flanagan et al. | 717/124 |
| 2006/0174235 | A1* | 8/2006 | Kamada et al. | 717/141 |
| 2007/0118724 | A1 | 5/2007 | Patel | |

FOREIGN PATENT DOCUMENTS

| | | |
|---|---|---|
| KR | 2002-0028814 A | 4/2002 |
| KR | 10-2004-0063923 A | 7/2004 |
| WO | 0248821 A2 | 6/2002 |
| WO | 0248821 A3 | 6/2002 |

OTHER PUBLICATIONS

Communication dated Nov. 20, 2012, issued by the Japanese Patent Office in counterpart Japanese Patent Application No. 2008-043716.

Communication, dated Nov. 20, 2013, issued by the Korean Intellectual Property Office in counterpart Korean Patent Application No. 10-2007-0054661.

Communication dated May 12, 2014 issued by the Korean Intellectual Property Office in counterpart Korean Application No. 10-2007-0054661.

* cited by examiner

METHOD AND APPARATUS FOR INCREASING TASK-EXECUTION SPEED

CROSS-REFERENCE TO RELATED APPLICATION

This application claims priority from Korean Patent Application No. 10-2007-054661 filed on Jun. 4, 2007 in the Korean Intellectual Property Office, the disclosure of which is incorporated herein by reference in its entirety.

BACKGROUND OF THE INVENTION

1. Field of the Invention

Apparatuses and methods consistent with the present invention relate to increasing task-execution speed, and, more particularly, to increasing task-execution speed by compiling code to bytecode, and executing native code in units of blocks instead of bytecode, in which a block is a group of a series of bytecodes.

2. Description of the Related Art

Java is an object-oriented programming language that can be executed on any platform. A platform refers to hardware on which a program or software such as an operating system (OS) runs. Code written in Java is compiled into bytecode by a Java compiler, and the bytecode is executed by a Java virtual machine ported on various platforms.

Bytecode is a command language, such as a machine language, and is not dependent on a particular processor. Bytecode is executed by a virtual machine. That is, the virtual machine interprets the bytecode into corresponding native code. Since the bytecode is not limited to a particular architecture, it can run on any architecture having the Java virtual machine. Accordingly, a binary bytecode file can be executed in a platform-independent manner.

However, a major drawback of Java is execution speed. A program compiled on a particular architecture runs faster than bytecode because it runs directly on hardware without requiring a processor architecture to be emulated on another processor architecture.

With bytecode, the Java virtual machine running on a processor has to convert the bytecode into native code before starting its operation.

Various hardware or software technologies are being tried in order to increase the execution speed of the bytecode. For example, software technology such as a just-in-time (JIT) compiler or a hotspot JIT compiler, which are faster than the JIT compiler, have been used to increase the speed of the Java virtual machine. The JIT compiler accompanies compile overhead and memory overhead when generating a native processor command.

As hardware technologies for increasing the interpretation speed of bytecode, a technology of modifying processor architecture and a technology of using an external processor are being tried.

FIG. 1 is a flowchart illustrating a conventional method of converting bytecode into native code and executing the native code.

Referring to FIG. 1, a software routine running on a central processing unit (CPU) loads bytecode, and a processor transmits the bytecode or an address of the bytecode to a Java interpretation accelerator (S10). When the address of the bytecode is transmitted, the bytecode located at the address may be called.

Then, the bytecode is input to a state machine included in a bytecode interpreter, and the state machine searches a native code cache for a cached and interpreted version of the bytecode, that is, native code (S20). If the native code is found in the native code cache, its address is transmitted to the processor (S60). Accordingly, native code is sequentially executed from the native code located at the address (S70).

If the native code is not found in the native code cache, the state machine searches a bytecode-interpretation lookup table (S30). The bytecode-interpretation lookup table denotes information stored in order to map or convert bytecode. It is determined whether the bytecode exists in the lookup table (S40). If the bytecode does not exist, the process ends. If the bytecode does exist in the lookup table, an interpreted version of the native code is copied to the native code cache (S50). The processor receives an address of the native code in the native code cache (S60), and executes commands corresponding to native code, starting with a command corresponding to the native code located at the address (S70).

After native code for the finally interpreted bytecode is executed, a control right is transferred to a software or hardware routine responsible for resuming the interpretation of the next bytecode. Such a handoff is performed in the final stage of executing the interpreted bytecode.

However, since the handoff causes a performance loss due to the extra overhead, an invention that can enhance system performance by reducing the frequency of handoffs is needed.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. The present invention is to provide an apparatus and method for increasing task-execution speed by compiling code to bytecodes and executing native code in units of blocks, in which a block is a group of a series of bytecodes.

According to an aspect of the present invention, there is provided an apparatus for increasing task-execution speed. The apparatus includes a receiving unit which receives a bytecode, a control unit which identifies whether the received bytecode is a last bytecode of a block, and a transmitting unit which transmits an address of a first native code from one or more native codes, which correspond to one or more bytecodes included in the block, based on the identification result.

According to another aspect of the present invention, there is provided a method of increasing task-execution speed. The method includes receiving a bytecode, identifying whether the received bytecode is a last bytecode of a block, and transmitting an address of a first native code from one or more native codes, which correspond to one or more bytecodes included in the block, based on the identification result.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF EXEMPLARY EMBODIMENTS

Figure 1:
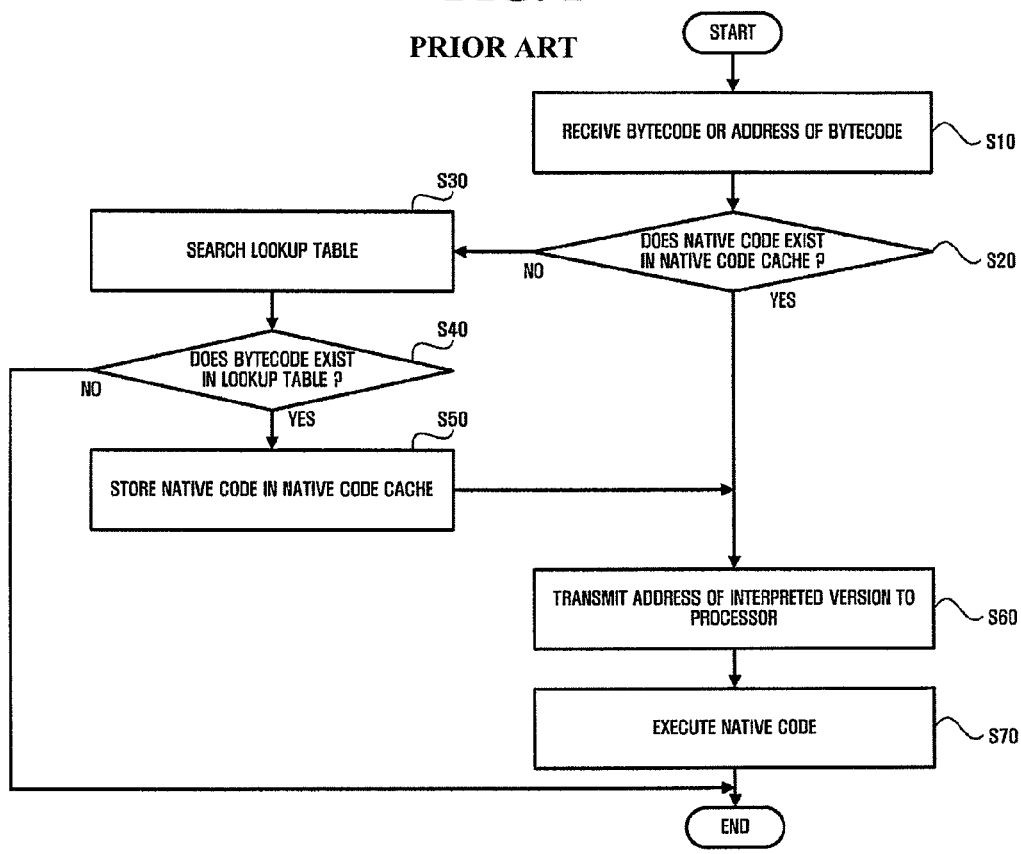
FIG. 1 is a flowchart illustrating a conventional method of converting a bytecode into a native code and executing the native code.

The various aspects and features of the present invention and methods of accomplishing the same may be understood more readily by reference to the following detailed description of exemplary preferred embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the present invention to those skilled in the art, and the present invention is defined by the appended claims. Like reference numerals refer to like elements throughout the specification.

Hereinafter, exemplary embodiments of the present invention will be described in detail with reference to the accompanying drawings.

Figure 2:
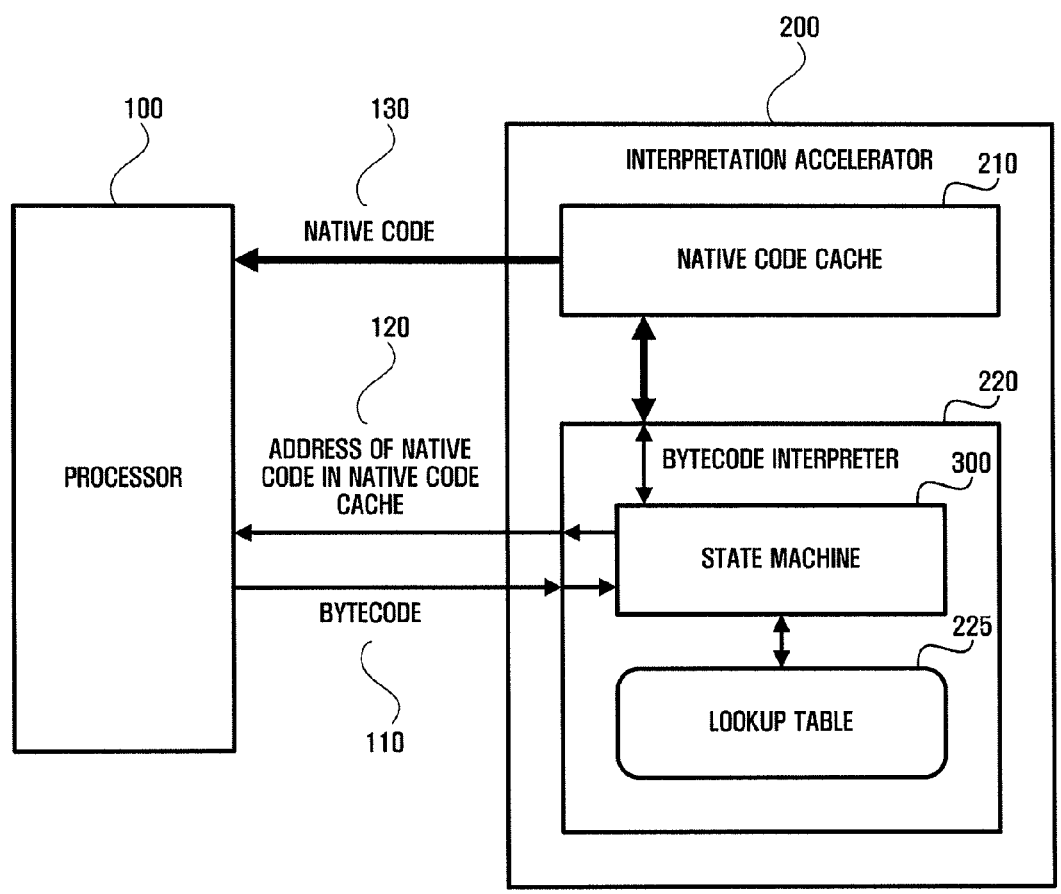
FIG. 2 is a block diagram of an apparatus for increasing task-execution speed according to an exemplary embodiment of the present invention.

FIG. 2 is a block diagram of an apparatus for increasing task-execution speed according to an exemplary embodiment of the present invention. Referring to FIG. 2, the apparatus (hereinafter, referred to as an "acceleration apparatus") includes a processor 100 and an interpretation accelerator 200. The interpretation accelerator 200 includes a native code cache 210 and a bytecode interpreter 220.

The processor 100 transmits bytecode 110 to the interpretation accelerator 200, receives native code 130 corresponding to the transmitted bytecode 110, and executes commands corresponding to the received native code 130. Bytecode 110 is a command language, such as a machine language into which programming codes are compiled, and include platform-independent code.

The processor 100 may transmit addresses of the bytecodes 110, instead of the bytecodes 110, to the interpretation accelerator 200. In this case, the processor 100 may receive the native code 130 corresponding to the bytecodes 110, and execute commands corresponding to the received native code 130.

In order to execute the commands corresponding to the received native code 130, the processor 100 receives an address 120 of a native code from the interpretation accelerator 200, and executes the commands corresponding to the native code 130, which exist at addresses after the received address 120, starting with a command corresponding to the native code at the received address 120. That is, the processor 100 does not transmit a bytecode, and receives a native code corresponding to the bytecode. Instead, the processor 100 transmits a plurality of bytecodes, and executes a plurality of commands corresponding to a plurality of native codes received.

The native code 130, which are to be executed by the processor 100, may exist in units of predetermined blocks. A last native code of a block may include information indicating that it is located at the end of the block. Accordingly, the processor 100 executes a plurality of commands corresponding to a series of native codes included in a block. After executing a command corresponding to the last native code of the block, the processor 100 receives an address of a first native code in a next block and executes commands for the next block.

The interpretation accelerator 200 receives the bytecodes 110 from the processor 100, and transmits an address (i.e., the address 120) of a first native code in a block, which includes the received bytecodes 110, to the processor 100.

The interpretation accelerator 200 may receive the addresses of the bytecodes 110, instead of the bytecodes 110, from the processor 100. In this case, the interpretation accelerator 200 may transmit the address 120 of the native code using the bytecodes 110 located at the received addresses.

In order to receive the bytecodes 110 and transmit the native code 130, the interpretation accelerator 200 may include a bytecode interpreter 220. The bytecode interpreter 220 includes a state machine 300 and a lookup table 225.

The state machine 300 identifies whether each of the bytecodes 110 received from the processor 100 is a last bytecode of the block, and transmits the address 120 of the native code based on the identification result.

That is, if each of the received bytecodes 110 is not the last bytecode of the block, the state machine 300 stores a native code corresponding to each of the bytecodes 110 in a native code cache 210. If each of the received bytecodes 110 is the last bytecode of the block, the state machine 300 transmits the address 120 of the native code, which corresponds to a first bytecode of the block, to the processor 100. The state machine 300 will be described in detail later with reference to FIG. 3.

The acceleration apparatus according to the present embodiment compiles a programming code into a bytecode, interprets the bytecode into a corresponding native code, and executes the native code. The programming code may include a Java code, which, however, does not indicate that the acceleration apparatus of the present embodiment executes a task according to the Java code only. It should be understood that the acceleration apparatus operates in all environments where compiling and interpretation are performed in real time.

Figure 3:
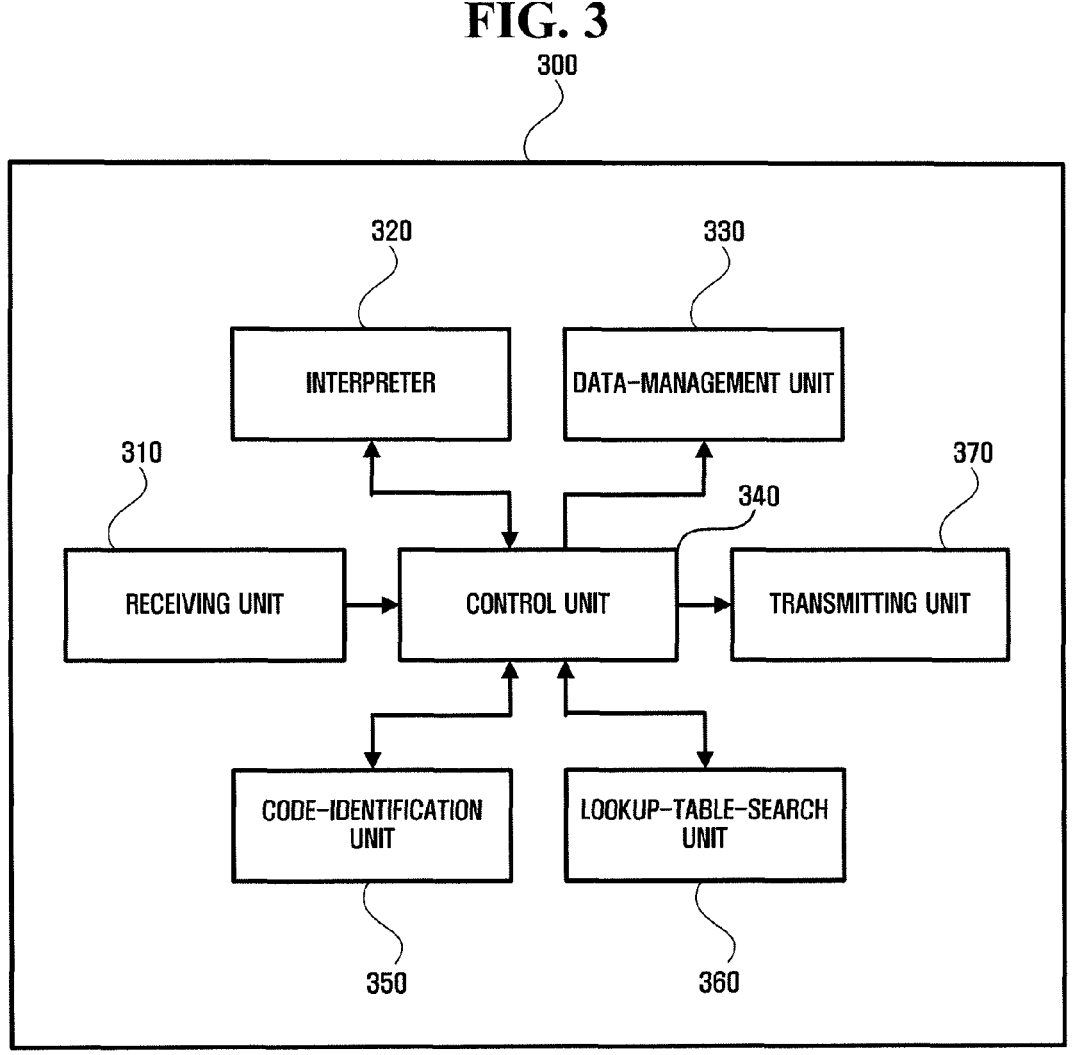
FIG. 3 is a detailed block diagram of a state machine included in the apparatus of FIG. 2.

FIG. 3 is a detailed block diagram of the state machine 300 included in the acceleration apparatus of FIG. 2. The state machine 300 includes a receiving unit 310, an interpreter 320, a data-management unit 330, a control unit 340, a code-identification unit 350, a lookup-table-search unit 360, and a transmitting unit 370.

The receiving unit 310 receives a bytecode from the processor 100. If the processor 100 transmits an address of the bytecode, the receiving unit 310 may receive the address of the bytecode.

The code-identification unit 350 identifies whether a native code corresponding to the received bytecode exists in the native code cache 210. The native code cache 210 is a storage space, which can be read and written to at high speed, that temporarily stores native code. The code-identification unit 350 identifies whether the native code corresponding to the received bytecode is stored in the native code cache 210.

The look-up table search unit 360 searches the lookup table 225 to identify whether the received bytecode exists in the lookup table 225. The lookup table 225 specifies corresponding relationships between bytecode and native code. By searching the lookup table 225, the lookup-table-search unit 360 can identify whether and where a native code corresponding to a particular bytecode exists.

The interpreter 320 interprets the received bytecode into a native code. That is, if the code-identification unit 350 determines that the native code corresponding to the received bytecode is not stored in the native code cache 210 and if the search result of the lookup-table-search unit 360 indicates that the native code corresponding to the received bytecode does not exist, the interpreter 320 analyzes the received bytecode and generates a native code.

The data-management unit 330 stores native code in the native code cache 210. That is, when the lookup-table-search unit 360 identifies the location of the native code corresponding to the received bytecode, the data-management unit 330 stores the native code in the native code cache 210. Alternatively, when the interpreter 320 generates native code, the data-management unit 330 stores the generated native code in the native code cache 210.

The data-management unit 330 stores native code in response to control commands received from the control unit 340. The data-management unit 330 may sequentially store the native code in the storage space of the native code cache 210 according to the order in which the control commands are received. For example, a current native code is stored at an address next to that of a previously stored native code.

The data-management unit 330 may include an index table specifying whether and where native code is stored. In this case, the data-management unit 330 may store a native code at an arbitrary position of the native code cache 210. Once the native code is stored, the data-management unit 330 can update the index table.

The control unit 340 identifies whether the received bytecode is a last bytecode of a block. A last bytecode of a block may include information indicating that it is located at the end of the block. The control unit 340 identifies whether the received bytecode is the last bytecode of the block using this information. For example, each bytecode may include a flag indicating whether it is the last bytecode. If the value of the flag is zero, the bytecode is not the last bytecode. If the value of the flag is one, the bytecode can be set as the last bytecode.

In addition, the control unit 340 controls the overall operations of the receiving unit 310, the interpreter 320, the data-management unit 330, the code-identification unit 350, the lookup-table-search unit 360, and the transmitting unit 370.

Based on the identification result of the control unit 340, the transmitting unit 370 transmits to the processor 100 an address of a first native code among one or more native codes corresponding to one or more bytecodes in the block.

When receiving the address of the first native code, the processor 100 executes commands corresponding to all the native code of the block, starting with a command corresponding to the first native code located at the received address. The processor 100 may also identify the sequence of native codes to be executed and the position of the last native code with reference to the index table.

Figure 4:
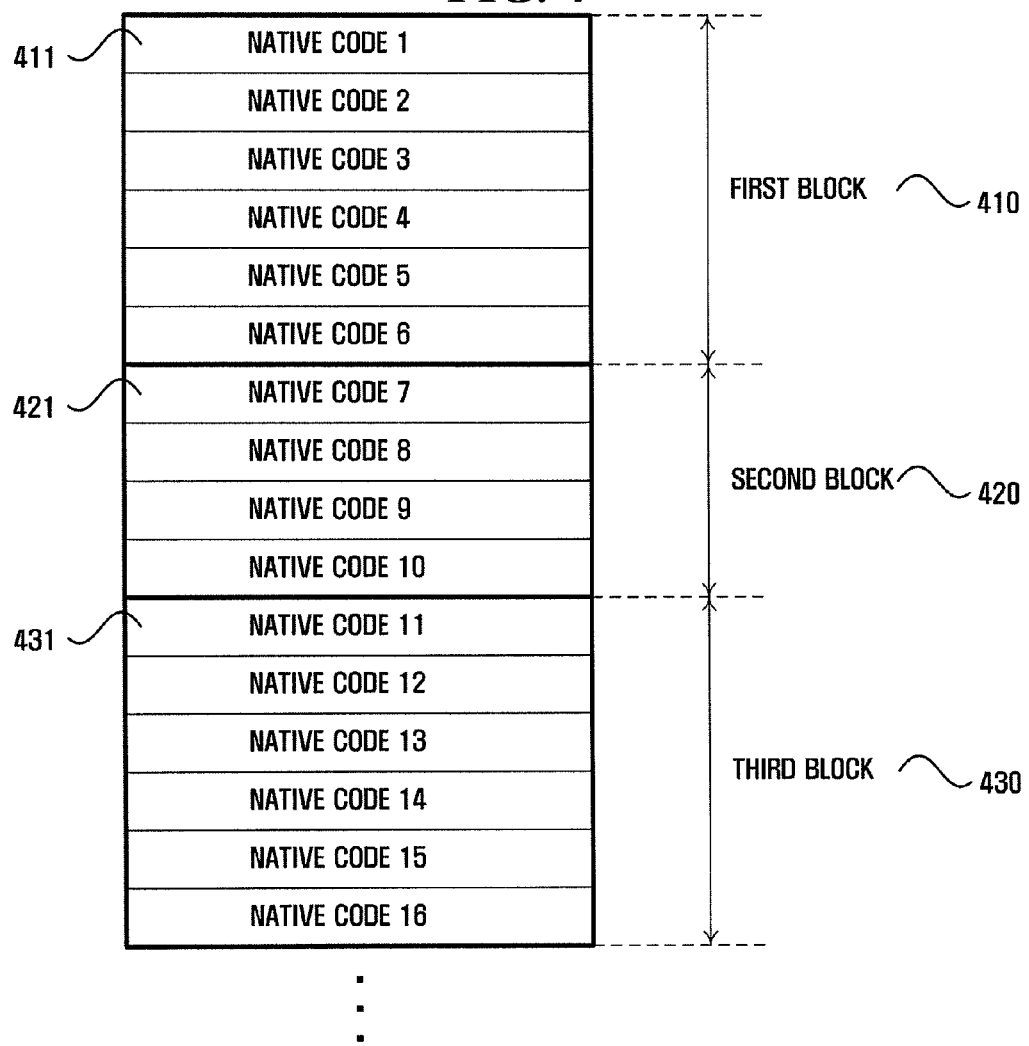
FIG. 4 is a diagram illustrating native code grouped in units of blocks according to an exemplary embodiment of the present invention.

FIG. 4 is a diagram illustrating native code grouped in units of blocks according to an exemplary embodiment of the present invention.

As described above, native code is stored in the native code cache 210. The native code may be stored in units of blocks as illustrated in FIG. 4. That is, one or more native codes may be included in each of one or more blocks, that is, first through third blocks 410 through 430.

When the receiving unit 310 receives a bytecode, the code-identification unit 350 and the lookup-table-search unit 360 identify whether a native code corresponding to the received bytecode exists. The interpreter 320 generates a native code based on the identification result, and the data-management unit 330 stores a native code, which is stored in a separate storage medium, or the generated native code in the native code cache 210 in units of blocks.

If the control unit 340 identifies that the received bytecode is a last bytecode of the first, second or third block 410, 420 or 430, it extracts an address of a first native code 411, 421 or 431 of the first, second or third block 410, 420 or 430, and transmits the extracted address to the processor 100 through the transmitting unit 370. Here, an address of a native code denotes an address in the native code cache 210. The processor 100 that receives the extracted address sequentially extracts native codes, starting with the first native code 411, 421 or 431 located at the received address, and executes commands corresponding to the extracted native code. This operation continues until a command corresponding to the last native code of the first, second or third block 410, 420 or 430 is executed. When tasks according to all native code of the first, second or third block 410, 420 or 430 are completed, the receiving unit 310 receives a next bytecode.

Figure 5:
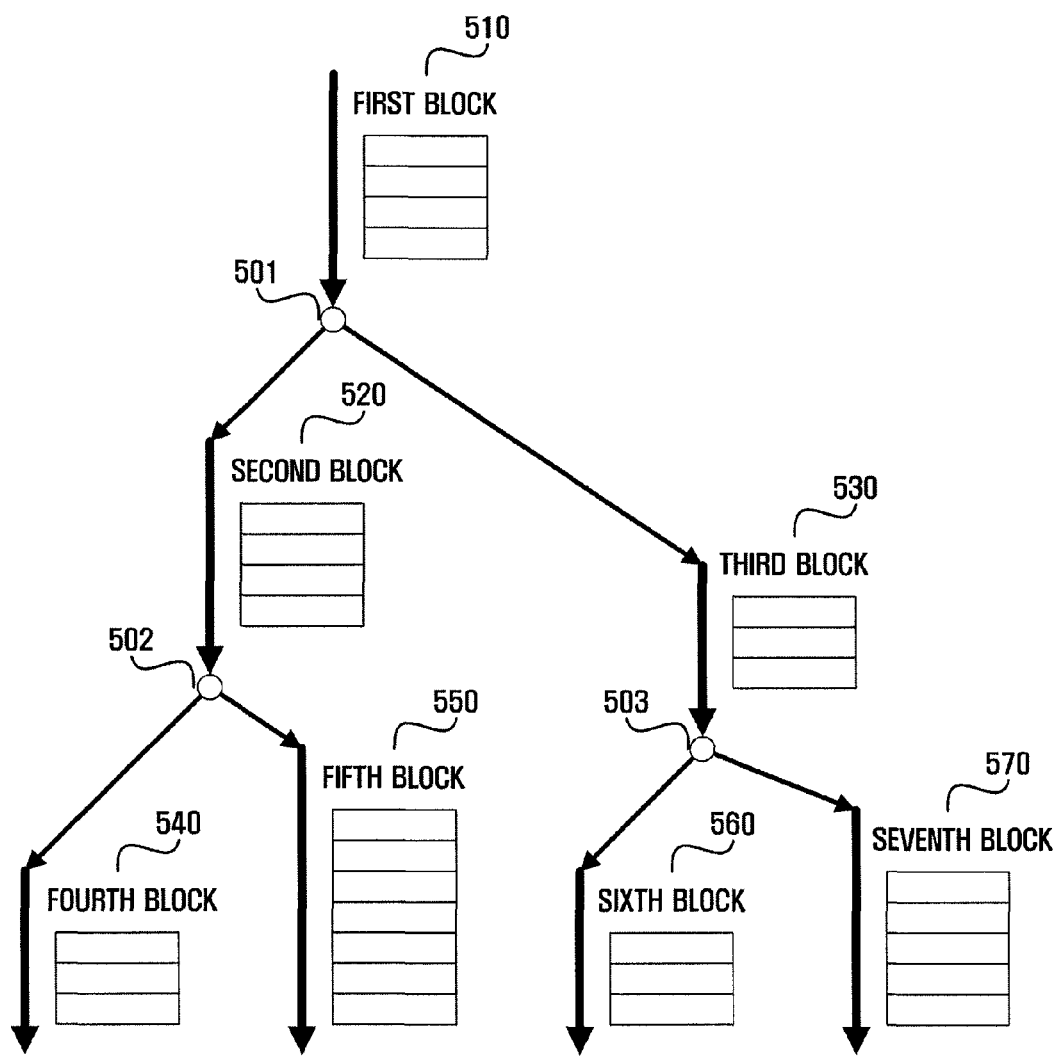
FIG. 5 is a diagram illustrating blocks formed based on branch commands according to an exemplary embodiment of the present invention.

FIG. 5 is a diagram illustrating blocks formed based on branch commands according to an exemplary embodiment of the present invention.

In the present invention, a block may be understood as a group of commands. That is, a series of commands included in a block are sequentially executed. Therefore, it is desirable to have a greater number of native codes in a block in order to reduce the handoff of compiling and interpretation. In fact, the size of a block may be determined by the position of a branch command.

For example, when a branch command such as an "if" command is included in a block, a subsequent task may be determined by the state of process at runtime. Therefore, the subsequent task is inevitably included in another block.

Ultimately, a command corresponding to a last native code of a block may be a branch command, and a block may branch into two or more blocks.

Referring to FIG. 5, since a command corresponding to a last native code of a first block 510 is a branch command, the first block 510 branches into second and third blocks 520 and 530 at a diverging point 501.

In addition, since commands respectively corresponding to last native code of the second and third blocks 520 and 530 are branch commands, the second and third blocks 520 and 530 branch into fourth and fifth blocks 540 and 550 and sixth an seventh blocks 560 and 570 at diverging points 502 and 503, respectively.

As described above, the position of a diverging point is determined by the position of a branch command. However, the diverging point may also be located at an arbitrary position according to a setting.

Figure 6:
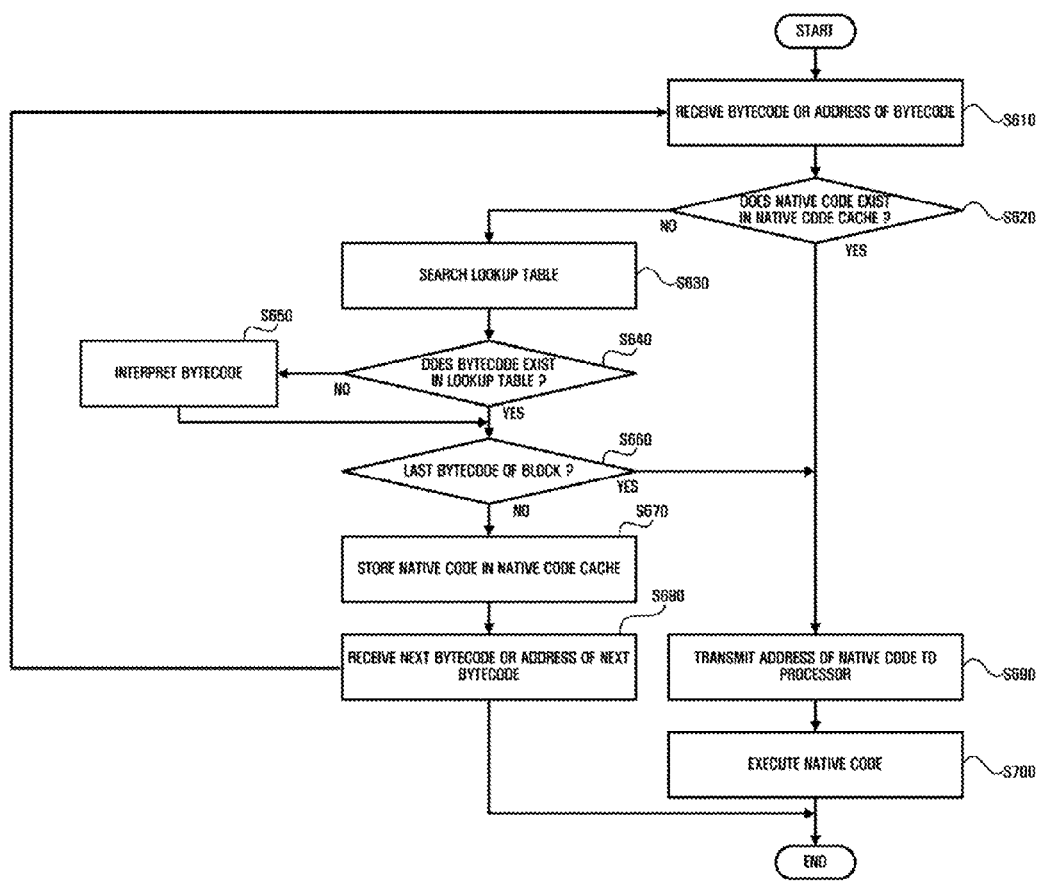
FIG. 6 is a flowchart illustrating a method of increasing task-execution speed according to an exemplary embodiment of the present invention.

FIG. 6 is a flowchart illustrating a method of increasing task-execution speed according to an exemplary embodiment of the present invention.

In order to increase task-execution speed, the receiving unit 310 of the state machine 300 receives a bytecode or an address of the bytecode from the processor 100 (S610).

The code-identification unit 350 identifies whether a native code corresponding to the received bytecode is stored in the native code cache 210 (S620). When the address of the bytecode is identified, the code-identification unit 350 may call the bytecode located at the address and identify whether the native code corresponding to the bytecode is stored in the native code cache 210 by using the called bytecode.

When the native code corresponding to the received bytecode is stored in the native code cache 210, the transmitting unit 370 transmits an address of the native code in the native code cache 210 to the processor 100 (S690).

After receiving the address of the native code, the processor 100 executes commands corresponding to all native code of a corresponding block, starting with a command that corresponds to the native code located at the received address (S700).

When the native code corresponding to the received bytecode is not stored in the native code cache 210, the lookup-table-search unit 360 searches the lookup table 225 (S630) and identifies whether the received bytecode exists in the lookup table 225 (S640).

When the received bytecode is found in the lookup table 225, the control unit 340 identifies whether the received bytecode is a last bytecode of the block (S660).

When the received bytecode is not found in the lookup table 225, a control right is transferred to the interpreter 320, and the interpreter 320 generates a native code corresponding to the received bytecode (S650). Then, the control unit 340 identifies whether the received bytecode is the last bytecode of the block (S660).

If the received bytecode is the last bytecode of the block, the transmitting unit 370 transmits an address of the native code corresponding to the received bytecode to the processor 100 (S690).

If the received bytecode is not the last bytecode of the block, the data-management unit 330 stores the native code corresponding to the received bytecode in the native code cache 210 (S670). Here, the data-management unit 330 may update an index table specifying whether and where the native code is stored.

After the native code is stored in the native code cache 210 and the index table is updated, the receiving unit 310 receives a next bytecode or an address of the next bytecode (S680). Then, the operations of identifying whether a native code corresponding to the received bytecode exists and identifying the location of the received bytecode in a corresponding block are repeatedly performed.

As described above, an apparatus and method for increasing task-execution speed according to the present invention can increase task-execution speed by compiling code to bytecode, and executing native code in units of blocks, wherein a block is a group of a series of bytecodes.

While the present invention has been particularly shown and described with reference to exemplary embodiments thereof, it will be understood by those of ordinary skill in the art that various changes may be made in the form and details without departing from the spirit and scope of the present invention as defined by the following claims. The exemplary embodiments should be considered in a descriptive sense only and are not for purposes of limitation.

What is claimed is:

1. An apparatus for increasing task-execution speed, the apparatus comprising:
    a receiver which receives a bytecode among a plurality of bytecodes included in a block;
    a controller which determines whether the received bytecode is a last bytecode of the block;
    a transmitter which transmits an address of a first native code from one or more native codes that correspond to one or more bytecodes included in the block if the received bytecode is determined to be the last bytecode of the block; and
    a processor which receives the address of the first native code that corresponds to a first bytecode of the plurality of bytecodes, and executes a plurality of commands corresponding to a series of native codes until executing a command corresponding to a last native code of the series of native codes is completed,
    wherein the transmitter does not transmit the first native code if the received bytecode is determined to not be the last bytecode of the block, and
    wherein bytecodes are added to the block until a command corresponding to a last native code of the block includes a branch command.

2. The apparatus of claim 1, wherein the block comprises bytecodes for commands that exist between branch commands.

3. The apparatus of claim 1, further comprising a data-management unit which stores a native code that corresponds to the received bytecode in a native code cache based on the result of the determining.

4. The apparatus of claim 3, wherein the transmitter transmits an address of a native code that corresponds to a first bytecode of the block of the native codes stored in the native code cache.

5. The apparatus of claim 1, further comprising an interpreter which generates a native code corresponding to the received bytecode based on whether the native code corresponding to the received bytecode exists.

6. The apparatus of claim 1, wherein the bytecode comprises Java code compiled by a Java compiler.

7. A method of increasing task-execution speed, the method comprising:
    receiving a bytecode among a plurality of bytecodes included in a block;
    identifying whether the received bytecode is a last bytecode of the block; and
    transmitting, by a transmitting unit, an address of a first native code from one or more native codes that correspond to one or more bytecodes included in the block if the received bytecode is determined to be the last bytecode of the block;
    wherein the transmitting unit does not transmit the first native code if the received bytecode is determined to not be the last bytecode of the block,
    wherein bytecodes are added to the block until a command corresponding to a last native code of the block includes a branch command, and
    wherein the method further comprises receiving the address of the first native code that corresponds to a first bytecode of the plurality of bytecodes, and executing a plurality of commands corresponding to a series of native codes until executing a command corresponding to a last native code of the series of native codes is completed.

8. The method of claim 7, wherein the block comprises bytecodes of one or more commands that exist between branch commands.

9. The method of claim 7, further comprising storing a native code that corresponds to the received bytecode in a native code cache based on the identification result.

10. The method of claim 9, wherein the transmitting of the address of the first native code comprises transmitting an address of a native code that corresponds to a first bytecode of the block of the native code stored in the native code cache.

11. The method of claim 7, further comprising generating a native code corresponding to the received bytecode based on whether the native code corresponding to the received bytecode exists.

12. The method of claim 7, wherein the bytecode comprises Java code compiled by a Java compiler.

* * * * *